(12) United States Patent
Pham et al.

(10) Patent No.: US 6,629,145 B1
(45) Date of Patent: Sep. 30, 2003

(54) SYSTEM AND METHOD OF NETWORK INDEPENDENT REMOTE CONFIGURATION OF INTERNET SERVER APPLIANCE

(75) Inventors: Duc Pham, Cupertino, CA (US); Nam Pham, San Jose, CA (US); Tien Le Nguyen, Cupertino, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/516,386

(22) Filed: Mar. 1, 2000

(51) Int. Cl.$^7$ .............................................. G06F 15/16
(52) U.S. Cl. ..................... 709/230; 709/226; 709/228; 709/243; 709/245; 707/10; 707/2
(58) Field of Search ................................ 709/226, 228, 709/243, 245, 230

(56) References Cited

U.S. PATENT DOCUMENTS

| | | | | |
|---|---|---|---|---|
| 5,812,819 A | * | 9/1998 | Rodwin et al. ............... 703/23 |
| 5,854,901 A | * | 12/1998 | Cole et al. .................. 709/245 |
| 5,884,038 A | * | 3/1999 | Kapoor ....................... 709/226 |
| 6,101,182 A | * | 8/2000 | Sistanizadeh et al. ....... 370/352 |
| 6,101,499 A | * | 8/2000 | Ford et al. ................... 707/10 |

* cited by examiner

Primary Examiner—David Wiley
Assistant Examiner—Phuoc H Nguyen
(74) Attorney, Agent, or Firm—David Volejnicek

(57) ABSTRACT

A server appliance self-adaptively configures to the operating parameters of a communications network to enable remote configuration control exclusively via the communications network. The server appliance includes a host computer system including a network interface controller and an operating system, executable by the host computer system, that is configurable by a defined set of network values for transmitting and receiving data packets through the network interface controller without network configuration conflicts. A control program, executable by the host computer system in conjunction with the operating system, determines, on initial start-up and specifically with respect to the communications network, an initial set of network values to configure the operating system. The control program is subsequently responsive to a first broadcast data packet containing network configuration parameters that are used to determine and apply a second set of network values to configure the operating system, which are then applied as the operating configuration of the operating system with respect to the network.

36 Claims, 4 Drawing Sheets

SYSTEM AND METHOD OF NETWORK INDEPENDENT REMOTE CONFIGURATION OF INTERNET SERVER APPLIANCE

BACKGROUND OF THE INVENTION

1. Field of the Invention

The present invention is generally related to the configuration and management of network connected computer systems and, in particular, to a server appliance that is automatically network adaptive to an otherwise unknown connected network and, further, is configurable securely over the network without requiring prior local configuration of the server.

2. Description of the Related Art

Although network connectivity has grown substantially both in the number of connected users and the scope of information that is available through public and private networks, fundamental configuration and reconfiguration problem remain. That is, in conventional networking systems, significant initial and ongoing maintenance is required to manage the individual network connection of each computer system with a particular network. This is conventionally true, whether the computer system is in a small network environment or just one of hundreds or more servers in a data-center facility.

The management of individual network connections represents a significant cost to users, to network computer providers, and to the network service providers. Until a computer system is properly configured and attached to the network, remote diagnostics and other centrally administrable configuration tests cannot be run. Conversely, an incorrectly configured computer system can significantly impair if not halt the functioning of an otherwise normally operating network. Thus, where the computer system user is not immediately familiar with the network connectively initialization process or is uninterested in performing the process themselves, an on-site service technician is required to configure land initialize the network connection. Such one-on-one service, though. conventionally required, is both costly and time-inefficient.

Conventional computer communications networks in current public and private use are typically based on the transmission control protocol/internet protocol (TCP/IP) defined stack or a similarly stacked set of networking protocols. In general, above the physical transmission protocol layers in these conventional network stacks, each connected computer system is required to be uniquely identified for all data exchange transactions over the network. This requirement for uniqueness appears in different forms at different levels within the stocks. In conventional TCP/IP-based systems, a unique physical ethernet address is used to permanently identify each network interface card (NIC) adapter. These media access control (MAC) addresses are typically hard coded to the network adapter. Although some provision exists for soft-coding changes to the assigned MAC address of an adapter, the MAC address is conventionally considered as being fixed for a specific network adapter.

Conversely, the IP layer of a TCP/IP stack is soft-assigned an IP address that is at least intended to be unique. The IP address is either statically assigned through an initial configuration procedure performed locally to the computer system or dynamically assigned through the operation of a conventional pull-protocol, such as the dynamic host configuration protocol (DHCP). Since using a static IP assignment is incompatible with using DHCP, a computer system must be specifically pre-configured individually with either a static IP address or as a DHCP client before any meaningful interoperation with a connected network is possible.

A DHCP client relies on a remote DHCP server to dynamically provide a unique IP address to the client. The DHCP client utilizes the IP broadcast capabilities of the TCP/IP stack to discover the existence of any DHCP server on the locally connected network. A direct, or pull-type, request to a specific DHCP server is then made by the DHCP client. This request is for a unique and unqualified IP address. Some additional data, within the narrow confines of the DHCP protocol and to the extent preconfigured into the DHCP server, such as the IP address of a domain name server (DNS), may also be provided. Conventionally, the IP address and the additional data are dynamically stored and used without modification by the DHCP client system.

IP address ranges have been established to define different classes of networks. Network masks (netmasks) are used to further partition networks with the purpose of establishing identified local network segments. The IP stack conventionally supports a network routing table that identifies gateways on the local network segment that can be used as the nomitive destination for data packets intended for remote network segments. Gateway computer systems use this mechanism to screen out and ignore data packets intended for network segments different from their own or that comply with a route pre-established in the gateway routing table. This selectivity is required to prevent all of the gateway connected network segments from being flooded.

A direct consequence, however, is that a computer system must be installed with a static or DHCP provided dynamic IP address that is compatible with the directly connected network segment in order for the computer system to work within that network environment. If the IP address is not compatible, other locally connected computer systems will simply be unable to communicate with the incompatible network computer system.

Consequently, there is a clear need for some system and method of enabling a network computer system to be initially configured and subsequently reconfigured without requiring some on-site and site-specific configuration to be performed before the computer system can be connected to and managed from a network.

SUMMARY OF THE INVENTION

Thus, a general purpose of the present invention is to provide an efficient method and system for enabling the initial configuration and subsequent reconfiguration of a network connected computer system, such as a server appliance, to be performed remotely through the network.

This is achieved in the present invention by providing a server appliance capable of self-adaptively configuring to the operating parameters of a communications network to enable further remote configuration exclusively via the communications network. The server appliance includes a host computer system including a network interface controller and an operating system, executable by the host computer system, that is configurable by a defined set of network values for transmitting and receiving data packets through the network interface controller without network configuration conflicts. A control program, executable by the host computer system in conjunction with the operating system, determines, on initial start-up and specifically with respect to the communications network, an initial set of network values to configure the operating system. The control program is subsequently responsive to a first broadcast data packet containing network configuration parameters that are used to determine and apply a second set of network values to configure the operating system, which are then applied as the operating configuration of the operating system with respect to the network.

An advantage of the present invention is that, independent of the configuration of any other clients and servers connected to a network, a network server appliance can be initially connected to the network and immediately become configurable entirely through the network. No local terminal device, whether provided as a built-in display and keypad or connectable through a serial port, is required to enter any initial network configuration values.

Another advantage of the present invention is that server appliances and other network computer systems constructed to embody the present invention have significantly lowered direct and indirect costs. The initial self-configuration capability provided by the present invention removes the hardware cost of any integrated local terminal and port connectivity for a mobile terminal as well as the cost of providing on-site configuration support, whether through a technician visit or other technical support mechanisms.

A further advantage of the present invention is that the determination and configuration of all initial network settings can be established through the network connection. The network settings are not limited to DHCP managed values, which conventionally include only TCP/IP settings, but can include other network related settings to establish machine identity and security domain protections.

Still another advantage of the present invention is that reinitialization of the network settings may be performed anytime a conflict with any other client or server on the network is detected during the power-on initialization of the present invention. This allows systems implementing the present invention to be added and changed between existing networks without conflicting with the network settings of any other clients or servers connected to the network.

Yet another advantage of the present invention is that server appliances constructed according to the present invention are digitally serialized and, further, may be digitally signed, to ensure uniqueness of systems otherwise identically constructed. The digital signing of the serialization ensures that unauthorized construction of otherwise identical system is detectable.

Still another advantage of the present invention is that remote communications with a configuration client application are encrypted to limit exposure of the configuration information to examination and potential spoofing even though transmitted as part of broadcast data packets. An authentication mechanism may also be utilized to ensure that communications of network configuration parameters only occur between the configuration client application and network appliance.

A yet further advantage of the present invention is that, pending the acceptability of a network settings configuration by the configuration client application, static ARP routes may be installed by the server appliance and configuration client computer system to enable non-broadcast communications, thereby avoiding broadcast loading of the network, as well as security issue with the repeated broadcast of configuration information.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein.

DETAILED DESCRIPTION OF THE INVENTION

In connection with the preferred embodiments of the present invention, a server appliance is described as implementing the system and methods of the present invention. This server appliance is preferably a type of computer system generally optimized for use as a Web server, application server, file server, firewall, or other similar specific function computer system. These optimizations are generally directed to the size (or volume), power requirements, CPU performance, and I/O performance of the server appliance. As will be evident from the description of the present invention in connection with the preferred server appliance embodiments, however, the system and methods of the present invention are equally applicable and effective when used with other types of computer systems, including general purpose personal, workstation, and server computer systems and dedicated function computers, such as routers.

Figure 1:
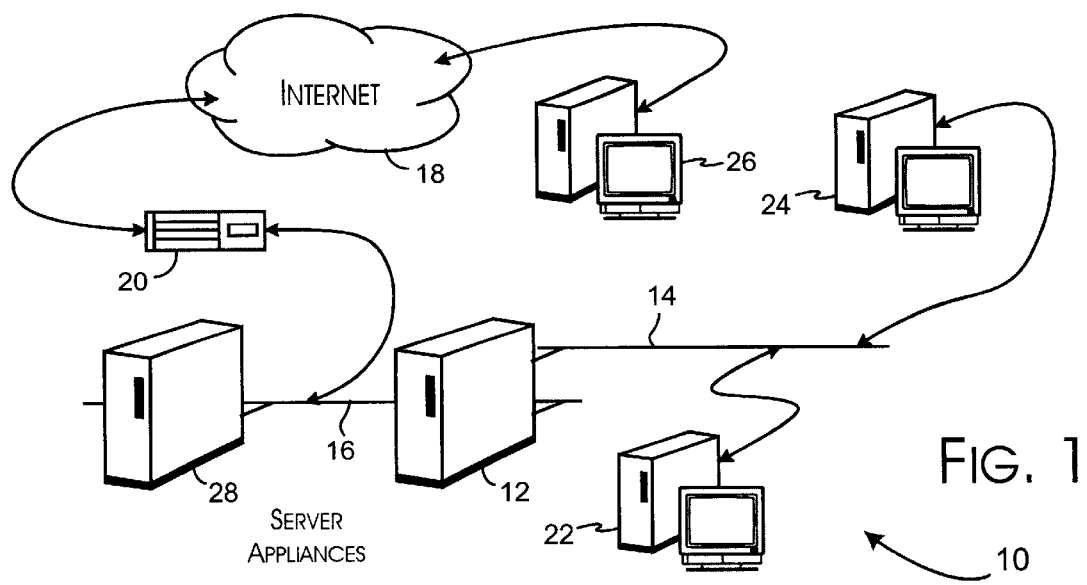
FIG. 1 is a general illustration of a network server appliance operating in a network operating environment.

As generally illustrated in FIG. 1 in regard to a network environment 10, a server appliance 12 may be connected to both a local area network (LAN) 14 and wide area network (WAN) 16 through separate NIC interfaces. The server appliance 12 operates as a network gateway between the LAN network 14 and the WAN network 16, including any other networks that may be connected to the WAN network 16. These other networks may include the Internet 18, which is accessible through a router 20.

As a network gateway, the server appliance 12 operates to selectively isolate network traffic that occurs on the LAN and WAN networks 14, 16. Thus, other computer systems 22, 24 connected to the LAN network 14 are not exposed to the potentially high bandwidth traffic that may occur on the WAN network 16. Conversely, private traffic on the LAN network 14 is not exposed on the WAN network 16 to other computers or servers 28, other networks 18, or distant computer systems 26.

Subject to these bandwidth and security considerations of operating networks, the present invention provides for the initial installation configuration and subsequent reconfiguration of the server appliances 12, 28, or a client computer system 24, to an existing LAN network 14 having an attached and operating network client computer system 22. In the preferred embodiments of the present invention, the client computer system 22 executes a configuration control application, which implements a network configuration management process. The configuration control application preferably includes a local repository of configuration information established for the LAN network 14 and the WAN network 16. The scope of network configuration control by the configuration control application is limited to those networks that are connected to the LAN, network 14 that can exchange network broadcast data packets with the LAN network 14. Thus, the locally connected client computer system 24 and the server appliance 12 are both immediately within the potential scope of configuration control of the configuration control application. The server appliance 28 will be within the scope of configuration control once the configuration of the server appliance 12 is established to enable the routing of broadcast data packets between the networks 14, 16. Conversely, a configuration control boundary is preferably established by the router 20 by blocking all broadcast data packets to or from the Internet 18. Although the router 20 blocks the routing of broadcasts between network segments, the router 20 may nonetheless respond to and be configured in response to broadcasts that can be sufficiently authenticated by the router 20.

Figure 2:
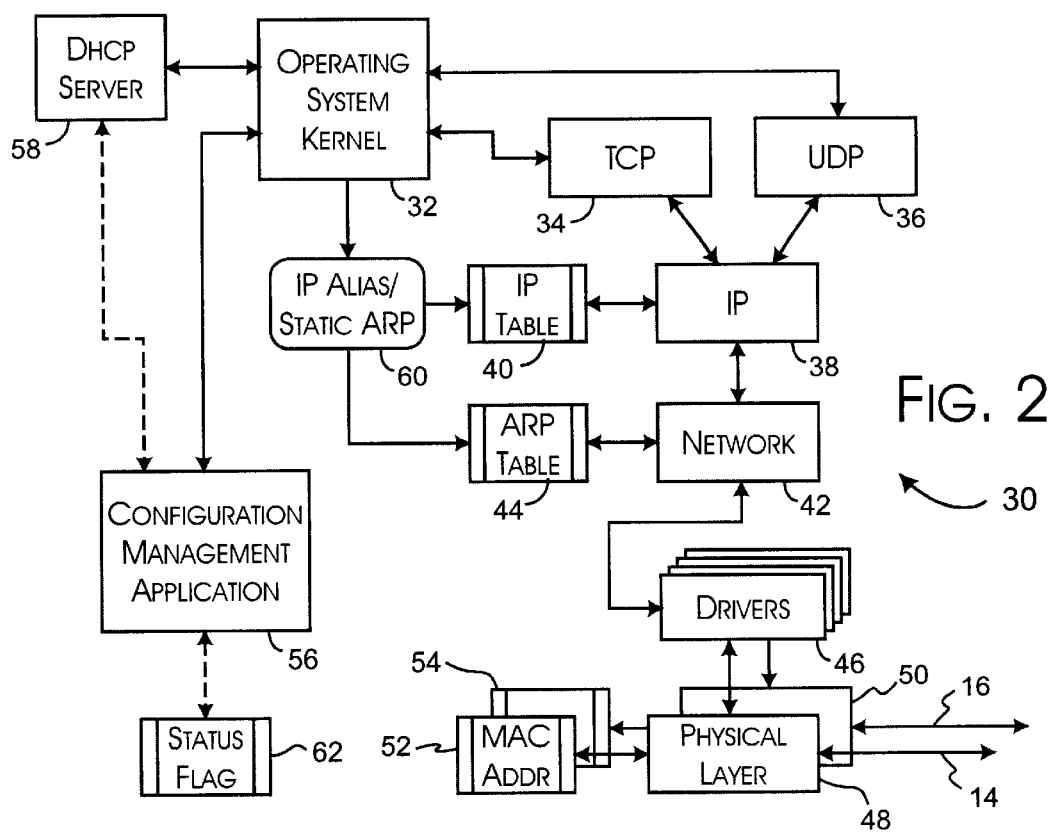
FIG. 2 is a block diagram of a network operating system and server management application configured in accordance with a preferred embodiment of the present invention.

The server appliances 12, 28 preferably execute a network operating system, such as the Linux™ operating system, which supports the execution of an application level program that implements the configuration protocols of the present invention. As shown in FIG. 2 the preferred network operating system environment includes an operating system kernel 32 that supports conventional interfaces to the TGP and UDP layers 34, 36 of a TCP/IP stack. The UDP layer is specifically used for the transmission and reception of network broadcast messages. An IP layer 38 operates in conjunction with an IP table 40 that stores the IP address assigned to the IP layer 38, as well as the IP routing information used by the IP layer 38. IP addresses are resolved by a network layer 42 against an address resolution protocol (ARP) table 44 to determine actual network paths between IP address identified computer systems. One or more NIC drivers 46 may be installed in the TCP/IP stack to support the hardware dependencies of physical layer NICs 48, 50. Each of the NICs 48, 50 are provided with a MAC address 52, 54 typically stored in a read-only memory located on the NICs 48, 50.

A configuration management application 56 is preferably executed on each of the server appliances 12, 28, within the application execution environment supported by the operating system kernel 32. In accordance with the preferred embodiments of the present invention, the configuration management application supports a socket-level connection through the operating system kernel 32 with the TCP/IP stack. This allows fully qualified IP address TCP connections to be established through the TCP 34 and IP 38 layers to other computer systems present on a locally connected network, 14, 16. IP broadcast connections are routed through the operating system kernel 32 and the UDP layer 36. Thus, the configuration management application 56 has the ability, consistent with the preferred embodiments of the present invention, to establish broadcast-based communications with other computer systems through the locally connected network 14, 16.

A modified DHCP server 58 is also preferably provided and potentially executed on each of the server appliances 12, 28. The configuration management application 56 is preferably capable of both enabling and disabling execution of the DHCP server 58. Through the modification of the DHCP server 58, the configuration management application is also able to direct the operation of the DHCP server to issue a DHCP protocol discovery request and to receive the results of that request. Specifically, a conventional DHCP server receives and responds to DHCP discovery requests from a network 14, 16, which are originated by remote DHCP clients. The DHCP server 58 is modified to allow the server 58 to itself issue a discover request to the networks 14, 16 in order to identify the operating presence of any remote DHCP server connected to and serving the networks 14, 16. The presence or absence of a responding remote DHCP server on the networks 14, 16 is reported back to the configuration management application 56.

Additionally, the configuration management application 56 is preferably capable of using the conventional capabilities of the operating system kernel 32 to provide and set IP alias addresses and static ARP addresses. Thus, an IP alias can be specified by the configuration management application through the appropriate operating system kernel 32 interface to have the IP address set 60 in the IP table 40 as an equivalent IP identifier for the TCP/IP stock. The IP layer 38 will therefore operate to recognize the IP alias address as a proper source and destination address for this TCP/IP stock.

Similarly, static ARP table 44 entries can be explicitly specified by the configuration management application 56. These entries are then set 60 in the ARP table 44 along with those entries that are automatically discovered from the attached networks 14, 16 through the conventional operation of the ARP protocols. Consequently, systems, such as the configuration management client can be explicitly identified by an ARP entry where such an entry would not otherwise be automatically entered.

Finally, a status flag 62 is preferably provided as an indicator of the configuration status of the network sever 12, 28. This status flag 62 is preferably persistent through the use of some non-volatile memory, such NVRAM or a disk file. Since the server appliances 12, 28 utilize an Intel®-type industry standard architecture motherboard, which includes a battery-backed CMOS memory, server appliances without local disks could use the CMOS memory to store the status flag 62. In the preferred embodiments of the present invention, however, the operating system is loaded and operated from a local disk. A registry data structure, stored in a disk file, is preferably used to store the status flag 62. This registry is also preferably used to store other persistent information defining the configuration parameters of the server appliance 12.

Figure 3:
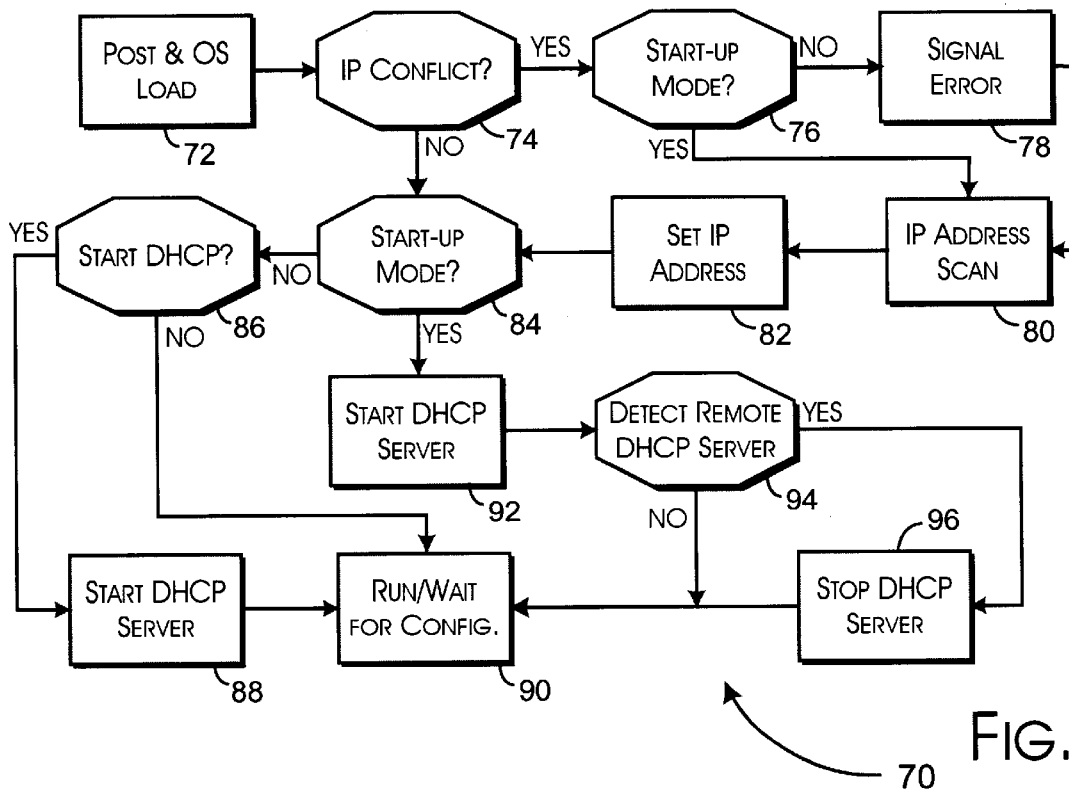
FIG. 3 provides a process diagram of the preferred start-up sequence of a server appliance implemented in accordance with the present invention.

The boot-up process implemented by a server appliance 12 generally in accordance with the present invention is shown in FIG. 3. Sections of the preferred process implementation are also provided in pseudocode form in Tables 1 through 4. Each time the server appliance 12 starts, a conventional power-on self-test (POST) and operating system load process 72 is performed. The configuration management application 56 is preferably started automatically as a background or daemon process. A current IP address and netmask are assumed by the server appliance 12. These values are the default values set during the factory construction of the server appliance 12, where the server appliance 12 has not been previously configured. Alternately, the IP and netmask are assumed from their last configured values, which may be values corresponding to the currently connected network or another entirely different network against which the server appliance was previously configured.

The IP conflict check implemented by the present invention makes no assumption about the nature of the local network, specifically in regard to how IP addresses are assigned. There is no reliance on the prior existence and proper configuration of a DHCP server on the local network. Further, there is no requirement for preconfiguring the server appliance 12 to specifically use either a network compatible static IP address or to operate as a DHCP client to acquire a compatible IP address. As will be evident, the present invention operates from the assumed IP address and netmask even if those values are incompatible with the local network.

Where an IP address conflict is detected, and where the status flag 62 indicates that the server appliance 12 has apparently been configured for the current local network 76, an error message is generated 78. Preferably, this message is provided to alert the system administrator of the occurrence of an unexpected IP address conflict.

Regardless of the state of the status flag 62, the present invention provides for automatically resolving any detected IP address conflict. The list of IP addresses in use is scanned 80 (Table 3) to identify an IP address that is not in use. Preferably, where the server appliance is uninitialized, an unused IP address is selected and set 82 as the IP address of the server appliance 12.

TABLE 1

IP Check, Scan and Set

```
If (checkIPConflict(serverLAN.ipAddress) == TRUE) {
    /* Use ARP protocol to find out whether the boot up LAN IP Address
    assignment conflicts with another device in the network */
    If (SERVER_UNINITIALIZED == TRUE) {
        serverLAN.ipAddress = findAvailableIP(serverLAN);
            /* find an available IP Address in the server network space.
            Note: there is no client network known yet. */
        setIP(serverLAN.ipAddress);
            /* change the LAN IP Address to the available IP */
    } else {
        serverLAN.err = ERR_LAN_IP_ADDRESS_CONFLICT;
            // Set error flag
        errAlarm();          // Report the fatal errors.
            // This fatal error could be reported via several means:
                // broadcast in the existing network
                // email, paging, set alarm tone
        serverLAN.ipAlias = findAvailableIP(serverLAN);
            // find an available IP Address in the server network
        setIPAlias(serverLAN.ipAlias, serverNet);
            /* Set IP Alias for LAN interface with an available IP in the server
            network */
    }
}
```

In order to support a wide tolerance to different potential start-up circumstances, the validity of the assumed IP and netmask values are not determined from the state of the status flag 62. Where a server appliance 12 is formally prepared to be moved to another network, the status flag 62 may be reset to indicate that the server appliance 12 is in an uninitialized (SERVER_UNINITIALIZED) state. The IP address and netmask values may also be reset to their default values. To tolerate the absence of any such preparation, the present invention provides for an initial IP address conflict check 74, as indicated by the call to the checkIPConflict( ) routine in Table 1, independent of the state of the status flag 62. As reflected in the routine summary in Table 2, this call initiates an ARP interrogation of the locally connected network to obtain a list of all known IP addresses that are actively connected to the network. A comparison is then made to determine whether the IP address assumed by the server appliance 12 will be in conflict with the IP address assigned to any other computer system connected to the local network.

TABLE 2 checkIPconflict

```
STRUCT_PHYS_ADDR *checkIPconflict(STRUCT_IP ipAddress) {
    /* Use gratuitous ARP protocol to obtain the list of PHYS_ADDR of all
    network device with ipAddress.
        - Return a pointer to the buffer that contains the physical addresses
        of the devices with ipAddress (which indicate a conflict condition).
        - Return NULL if there is no conflict.
    Note: the ARP sender does not answer the ARP request and is excluded. */
}
```

TABLE 3 findAvailIP

```
STRUCT_IP findAvailIP(NET_INFO netInfo) {
    /* Sequence through all possible IP address of the network specified in
    netInfo to locate an available IP address by using the checkIPconflict()
    routine.
        Return the first IP that has no conflict.
        Return all ones (binary) if there is no IP available in the network.
    */
}
```

Where the state of the server flag 62 indicates that the server appliance 12 has been previously configured, the assumption is made that another device or computer system has been erroneously configured and is the source of the conflict. An error message is preferably generated 78. A scan 80 is then performed and a free IP address is selected. While this IP address might be set as a new IP address for the server appliance 12, preferably the IP address is set 82 as an IP alias for the server appliance 12, respecting the presumed choice of the IP address earlier configured into the server appliance.

Depending 84 on the state of the status flag 62, either a probe of the locally connected network or a previously configured registry value will determine whether a DHCP server is started on the server appliance 12. As indicated in Table 4, a DHCP configuration registry value is checked 86 on an initialized server appliance 12 to determine whether to start 88 the DHCP server 58. The server appliance 12 then enters the normal run state 90 of the operating system 32. The configuration management system 56, however, remains operative in a wait state receptive to further configuration management commands to configure or reconfigure the server appliance 12.

TABLE 4

DHCP Detect

```
/* Probe the network for an existing DHCP Server if this is an
uninitialized server */
If (SERVER_UNINITIALIZED == TRUE) {
    If (DHCP_Server_Exist() == TRUE) {
        Do_not_load_DHCP Server();
    } else {
        Load_DHCP_Server();      /* To Allow DHCP Clients Adapt its IP
                                    settings so that it is compatible with
                                    the default Server setup. */
    }
} else {            /* If the server is initialized, then the registry will
                    determine whether to load the DHCP server. */
    if (registry(DHCP_SERVER_ENABLED) {
        Load_DHCP_Server();
    }
}
```

Where the server appliance 12 is uninitialized 84, the DHCP server is pre-emptively started 92 under the continuing control of the configuration management application 58. A DHCP discovery process is initiated and responses from other DHCP servers are collected. Based on the collected responses, if any, the configuration management application 56 determines 96 to stop the DHCP server 58 or directly continue to the run state 90.

Figure 4:
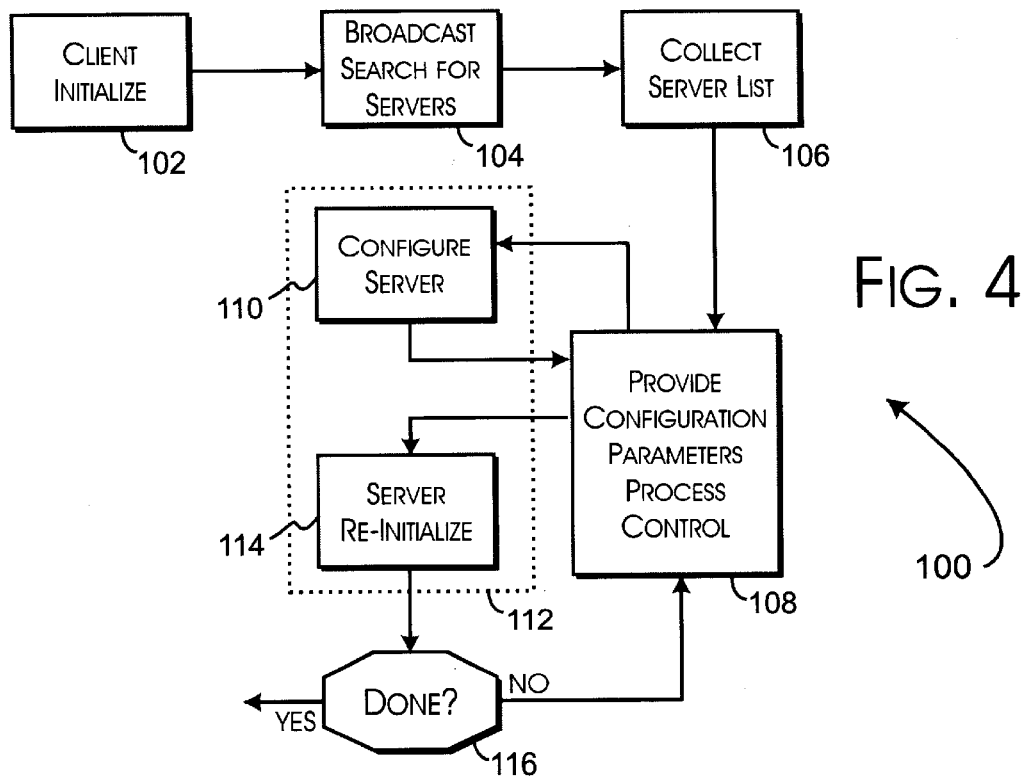
FIG. 4 provides a process diagram of the operation of a client configuration control application in accordance with a preferred embodiment of the present invention.

A configuration control application 100, generally illustrated in FIG. 4, is preferably executed by a network client computer system. 22. This application 100, once initialized 102, issues a broadcast message 104 to the locally connected network 14. Any server appliance 12 that receives this broadcast message, preferably responds with a broadcast message including a unique identifier of the responding server appliance 12. A list of the responding server appliances 12 is collected 106 by the configuration control application 100 and, in a preferred embodiment of the present invention, presented as a pick-list of server appliances to be configured. From the selection of a server appliance 12 to configure, a process of providing configuration parameters 108 from the configuration control application 100 to the configuration management application 56 to configure 110 the server appliance 12 is then performed. This process of configuration 108, 110 is preferably performed through a series of broadcast messages that are secure 112 relative to other computer systems and server appliances that can receive the broadcast messages.

In the preferred embodiment of the present invention, the configuration data exchanged by these broadcast messages in encrypted based on a password established between the configuration management and control applicants 56, 100. Where a server appliance 12 is in an uninitialized state, the first transaction between a configuration control application 100 and the configuration management application preferably forces the establishment of a new administration password that is then effectively unique to the particular instance of the server appliance 12. Encryption of the configuration data is then based directly or indirectly on this password.

In accordance with the present invention, the broadcast configuration messages provide a server appliance 12 with sufficient information to determine how to adapt to the network environment of the connected local network. Although the start-up process 70 enables the server appliance 12 to exist on the connected local network, the server appliance 12 is not necessarily configured sufficiently to enable direct communications with any other computer system attached to the local network. At a minimum, the IP address and netmask values assumed by the server appliance 12 may be entirely incompatible with those of the connected local network. Further, the IP address and netmask values assumed by the server appliance 12, those assigned to the client computer system 22 executing the configuration control application 100, or those assigned to some other computer system or device connected to the local network may be in actual conflict with one another. The present invention, nonetheless, enables communications between the configuration control client computer system 22 and the server appliance 12 sufficient to enable the server appliance 12 to determine and adapt to the network environment requirements of the locally connected network.

The communications between the server appliance 12 and the configuration control client 22 are performed through broadcast messages, initially unrestricted and subsequently restricted to a subnet as defined by a common netmask value shared by the server appliance 12 and the configuration control client 22. The unrestricted broadcast, typically an all-zeros IP address directed to a well-known configuration service port, is used in the discovery process 104 to elicit responses from all server appliances 12 regardless of their assumed IP address and netmask values. Each of these responses includes a unique identifier of the responding server appliance. In a preferred embodiment of the present invention, this unique identifier is based on the MAC address of the NIC through which the discovery broadcast was received and the response broadcast transmitted. Once the configuration control client 22 and server appliance are at least able to establish a common netmask valuer netmask restricted broadcast messages, still directed to the well-known configuration service port, are used.

An initial configuration transaction, using get_server_info_command (clientNet), provides the configuration management application 56 with the network environment settings of the configuration control client 22. A data structure, such as listed in Table 5, is provided as a basis for a server appliance to evaluate and adapt to the local network environment.

TABLE 5

Data Structure struct NET_INFO {
STRUCT_IP ipAddress;            // IP Address
STRUCT_NETMASK netmask;         // Netmask
STRUCT_IP IP_Alias;             // IP alias, if any. 0 means none.
STRUCT_PHYS_ADDR physicalAddress;
/* Physical Address of the interface, 0 means not found, all ones means not applied. */
STRUCT_ERR err;                 // status of the interface
} clientNet, serverLAN, serverWAN;

From the given client IP address and netmask, the configuration management application 56 is able to determine whether the server appliance 12 and configuration control client 22 are compatibly configured on the same subnet and whether either or both the client and server IP addresses are conflicted on the network.

In the absence of IP address conflicts and where the server appliance 12 and configuration control client 22 are configured for the same subnet, the configuration management application 56 preferably responds with an acknowledgment broadcast message, such as ackNetInfo(serverLAN), confirming to the client control application 100 the IP address and netmask of the server appliance 12 and that no conflicts or network incompatibilites are detected. The configuration control application 100 then preferably establishes a non-broadcast-based TCP/IP connection with the server appliance 12 and proceeds with any remaining configuration of the server appliance 12.

Where there is an IP conflict, though the server appliance 12 and configuration control client 22 are configured for the same subnet, the configuration management application 56 preferably first checks to determine the source of the conflict by executing the check_IP_conflict(serverLAN.ipAddress) routine. If a server IP address conflict is determined to exist, a resolve_server_IP_conflict(serverLAN) routine, generally as listed in Table 6, is executed.

TABLE 6 resolveServerIPConflict

```
int resolveServerIPConflict(NET_INFO serverLAN) {
    if (authenticateClient() != AUTHENTICATED) { /* determine whether the
            get_server_info_command() includes a correct administration
            password. */
        return ERR_NOT_AUTHENTICATED;
    }
    for (int i=0; i < MAX_RETRIES; i++) {
        err = NO_ERR;           // NO_ERR == no error
        serverLAN.ipAlias = findAvailableIP(clientNet);
            /* find an available IP in the client network and set the
            serverLAN.ipAlias to the available IP. */
        setIPAlias(serverLAN.ipAlias, clientNet);
            /* set the server LAN IP alias so that it is compatible with the
            client Network */
        broadcast(MSG_IP_RESOLUTION_OFFER, allInfo);
            /* broadcast all necessary info to client which includes the
            serverLAN and clientNet data structure */
        startTimeOut(MAX_TIME_OUT);          // start the timeout timer
        waitMsg(rcvMessage);                 /* wait for a message back from
                                                the client */
```

TABLE 6-continued resolveServerIPConflict

```
            if ((rcvMessage() != MSG_IP_RESOLUTION_OFFER_ACK) ||
                ((timeout() == TRUE) {              // Error condition
                removeIPAlias(serverLAN.ipAlias);
                if (timeout() == TRUE) err = ERR_TIME_OUT;
                    else err = NACK;
            } else {
                break;                              // client ACK on the OFFER
            }
        }
        if (err != NO_ERR) {
            errHandler();
            return;
        }
        setStaticARP(clientNet);
            /* Overwrite the ARP table with a static entry to associate the client
            Physical Address with the client IP address. This way a connection to
            the client can always be guaranteed. Note: the ARP static entry for
            the client IP will always be removed after the connection is closed.
            */
    }
```

Through this execution of the resolve_server_IP_conflict(serverLAN) routine, the configuration management application 56 determines and sets a non-conflicted IP alias address for the server appliance 12. Preferably, the selection of this IP address is conditional on the acceptance of the IP address by the configuration control application 100 through the presentation of the IP address as a selectable option of the configuration parameters 108.

If an IP address conflict is determined to exist relative to the configuration control client 22, a resolve_client_IP_conflict(clientNet) routine, generally as listed in Table 7, is executed.

TABLE 7 resolveClientIPConflict

```
    int resolveClientIPConflict(NET_INFO clientNet) {
        clientNet.ipAlias = findAvailableIP(clientNet);
            /* find an available IP in the client network and set the
            clientNet.ipAlias to the available IP. This is to inform the client that
            there is a conflict, in case the client is not capable of detecting its IP
            conflict condition. */
        setStaticARP(clientNet);
            /* Overwrite the ARP table with a static entry to associate the client
            Physical Address with the client IP address. This way a connection to
            the client can always be guaranteed. Note: the ARP static entry for
            the client IP will always be removed after the connection is closed. */
    }
```

Through the execution of the resolve_client_IP_conflict (clientNet) routine, the configuration management application 56 is able to force the association of an otherwise unused IP address with the configuration control client 22 by the setting of a corresponding static ARP entry. In effect, this establishes a reverse IP alias for the configuration control client 22 for the server appliance 12.

Finally, a broadcast message is sent from the server appliance 12 to the configuration control client to acknowledge the conflict-resolved configuration of the server appliance 12. At this point, the configuration control application 100 again preferably establishes a non-broadcast-based TCP/IP connection with the server appliance 12 and proceeds with any remaining configuration of the server appliance 12.

Where the configuration management application determines that there is a network incompatibility between the server appliance 12 and the configuration control client 22, specifically that the appliance 12 and client 22 are configured for different networks, the configuration management application additionally executes a resolveIPalias(clientNet) routine. This routine performs an IP address scan for an unused IP address within the client compatible network identified from the clientNet data structure. A setIPAlias (clientLAN.ipAlias, clientNet) routine is then executed with the result that an IP alias address is established for the server appliance 12 in and compatible with the client network environment. Thus, the server appliance 12 is both responsible for and capable of self-adaptation into the client network environment. A non-broadcast TCP/IP connection can then be established between the server appliance 12 and the configuration control client 22.

Once the configuration control client 22 has provided the necessary configuration control information 108 to a server appliance 12 to allow server configuration 110, a message may be sent to the configuration management application 56 to finalize the server configuration. Depending on the specifics of the particular operating system utilized by the server appliance 12, this re-initialization message may result 114 in the restarting of some service processes, a reload or reboot of the operating system, or no action at all. Preferably, once the server re-initialization 114 has been signaled, the configuration control application 100 determines 116 whether there are any remaining unconfigured server appliances. The process of providing configuration parameters 108 may automatically continue with any unconfigured server appliance 12. Alternately, the operator of the configuration control application 100 may elect to reconfigure any of the server appliances 12.

Figure 5A:
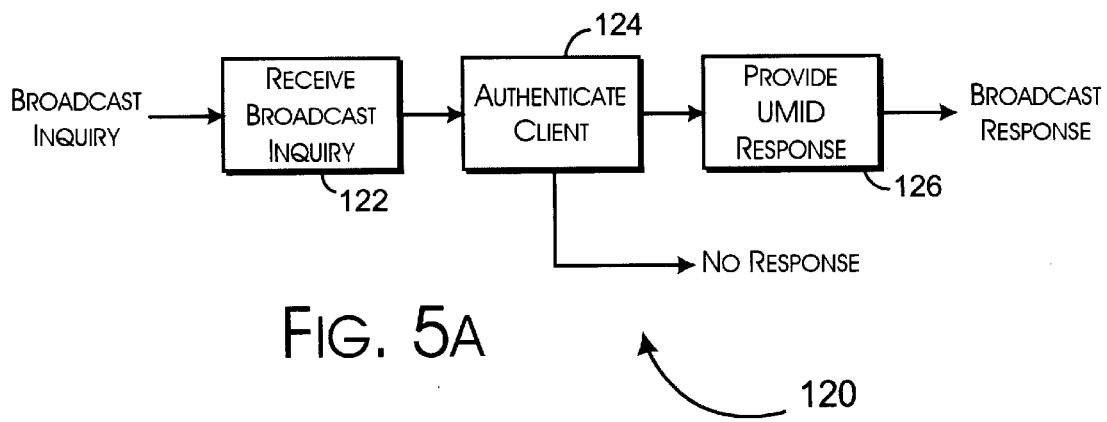
FIG. 5A provides a process diagram of the initial operation of the present invention in response to a broadcast inquiry for identification of server appliances awaiting configuration in accordance with a preferred embodiment of the present invention.

Referring now to FIG. 5A, in the preferred embodiment of the present invention, the process 120 of responding by the configuration management application 56 to broadcast inquiries involves propagating 122 the data contained in the broadcast through the TCP/IP stack 30 to the configuration management application 56. The process 120 is preferably a thread of the configuration management application 56 that remains active on the server appliance 12 and monitoring for IP connections on a defined well-known port. The contents of a broadcast data packet received on this port are preferably evaluated by the configuration management application 56, potentially including to determine the release level or type of the configuration control application 100. Other validation or authentication checks may also be made at this point, such as determining whether the inquiry is received through a NIC adapter connected to a public WAN or a private LAN. Provided that the configuration management application determines that a response is appropriate 124, a broadcast data packet is prepared 126 with the UMID of the server appliance 12, or at least corresponding to the NIC adapter through which the original broadcast inquiry was received.

Figure 5B:
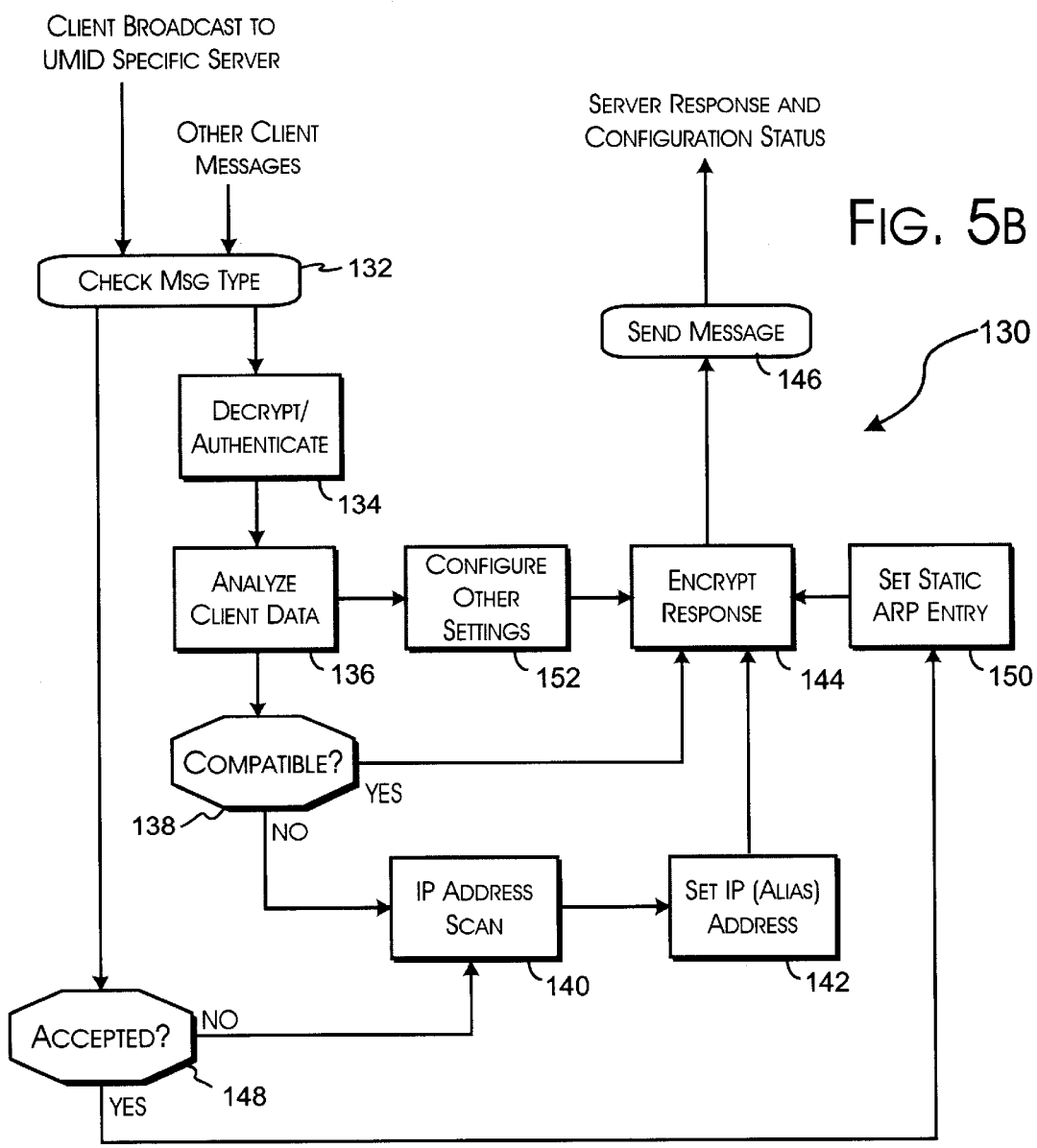
FIG. 5B provides a process diagram of the initial configuration of a network server through remote network communications with a client configuration control application in accordance with a preferred embodiment of the present invention.

The process operation 130 of the configuration management application 56 is further detailed in FIG. 5B. Client broadcast messages containing a particular UMID, and therefore intended for a specific server appliance 12, are detected and routed 132 for decryption and authentication 134. The resulting data is then analyzed 136 to, for example, extract a clientNet data structure. Based on the analysis 136, an IP address scan 140 and tentative setting of an IP address or alias 142 may be performed as needed 138 to handle conflicts and network incompatibilities. The resulting server network environment information (serverNet) is then collected and encrypted 144 before being sent 146 as a broadcast reply to the configuration control application 100.

As part of the network parameter configuration process 108, such as to enable interactive control by a user of the configuration control application 100, the effectively proposed server network environment settings are provided to the configuration control application 100 for prior approval. Alternatively, the tentative setting of network parameters by the configuration management application 56 allows the configuration control application 100 the opportunity to provide a clientNet data structure reflecting a different network environment to the configuration management application. This allows the configuration control application 100 to cause the configuration management application 56 to adapt the network environment of, for example, a server appliance 28 to a network 16 different from that of the configuration control client 22.

After the tentatively set network environment parameters of the server appliance 12, 28 are considered by the configuration control application 100, a broadcast acceptance message is sent to the UMID identified configuration management application 56. This message type is recognized 132 and checked 148 to determine if the proposed configuration is acceptable or not. If not accepted, the IP address scan 140 and set 142 is repeated and the new network environment parameters of the server 12, 28 are again sent 146. Where accepted 148, however, a static ARP entry is set 150 and a server acknowledgment message is prepared 144 and sent 146.

Other, typically subsequent and non-broadcast messages, are also received from the configuration control application 100. These messages are routed 132 and decrypted and authenticated 134 as before. Based on the identified type of these messages, the data content analysis 136 preferably retrieves different data structures from the message content. The resulting data is used to identify and provide a basis if not actual value for establishing 152 other configuration settings of the server appliance 12, 28 including, but not limited to, network environment settings that are not handled by the DHCP protocol. These additional parameters preferably correspond to the hostname, security domain, and access permissions. As these additional parameters are successfully set, corresponding server acknowledgment messages are prepared 144 and sent 146.

Figure 6:
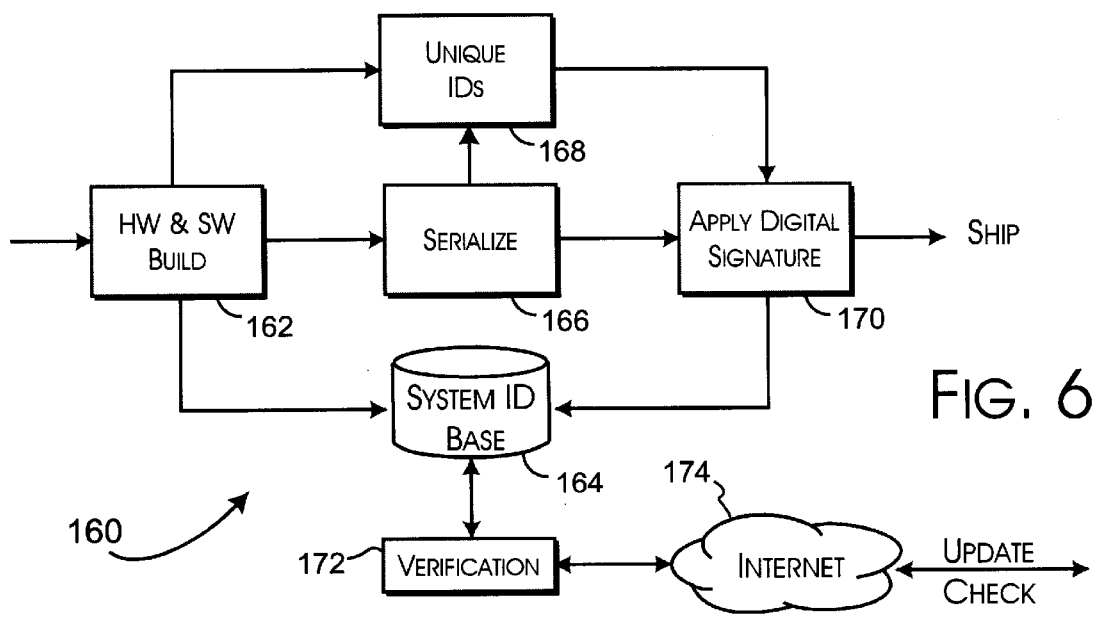
FIG. 6 provides a process diagram of the preferred construction and serialization of server appliances in accordance with the present invention.

The preferred process 160 of initially configuring server appliances 12, 28 for operation is generally shown in FIG. 6. With the base assembly 162 of a server appliance 12, preferably including an image copy of a disk drive containing the operating system and configuration management application, the hardware configuration is recorded in a database 164 organized by system identifiers. Each server appliance 12 is then serialized 166. This serialization includes establishing an initial unique hostname and setting a pseudo-random IP address for the server appliance 12. This hostname is preferably constructed by concatenating a defined prefix string, such as "SA," with at least a portion of the MAC address from the specific LAN NIC adapter included in the construction of the server appliance 12. Similarly, the IP address is preferably constructed as the concatenation of the first two octets of a Class-A network and the least significant sixteen bits of the MAC address.

In a preferred embodiment of the present invention, the serialized hostname and IP address values are used as permanent identifiers of a particular server appliance 12. These values, and potentially hardware specific values such as the MAC address of any included NIC or NICs and the microprocessor hardware identifier code, may be used as the basis of a digital signature that is then coded into the configuration of the operating system. These values, including the digital signature if used, are also preferably recorded in the database 164 against the server identifier for the particular server appliance 12. The server appliance 12 is then ready for shipment, installation, and operation.

Subsequently, operating system, configuration management application, and other software updates may become available. In accordance with the present invention, corresponding fixes and updates may be downloaded from, in effect, the manufacturing or maintenance facility for the server appliances 12. Any request for the update may be required to be validated 172 against the data stored in the database 164. Any server appliances 12 built without going through the serialization process 160 will therefore not be eligible for updates. Furthermore, any update obtained through the verification process 172 preferably will be specific to the serialization information stored in the database 164 for the downloading server appliance 12. The update can therefore be made to be unusable by any other server appliance 12. If the update is also digitally signed, there is little chance that the update can be manipulated for use by other than a single server appliance 12.

Thus, an efficient method and system for enabling the initial configuration and subsequent self-adaptive reconfiguration of a network connected computer system, such as a server appliance, to be performed remotely through the network has been described. While the present invention has been described particularly with reference to specialized server appliances, the present invention is broadly applicable to all network connected computer systems, servers, and appliances.

In view of the above description of the preferred embodiments of the present invention, many modifications and variations of the disclosed embodiments will be readily appreciated by those of skill in the art. It is therefore to be understood that, within the scope of the appended claims, the invention may practiced otherwise than as specifically described above.

What is claimed is:

1. A device coupleable to a communications network supporting self-adaptive initial configuration to the parameters of said communications network to enable remote configuration control of said device exclusively via said communications network, said device comprising:

a) a host computer system including a network interface for coupling to the communications network;

b) an operating system, executable by said host computer system, that is configurable by a defined set of network values for transmitting and receiving messages through said network interface controller without network configuration conflicts and that supports broadcast transmissions of messages through said network interface controller; and c) a control program, executable by said host computer system in conjunction with said operating system, that responds to receipt over the communications network of a first broadcast message by determining therefrom, specifically with respect to said communications network, and applying an initial set of network values to configure said operating system for the communications network, and by using the initial set of network values to transmit a second message over the communications network conveying an identifier of the device, said control program being subsequently responsive to receipt over the communications network of a third broadcast message directed to the device by means of the identifier and containing network configuration parameters for said device by using said network configuration parameters to determine and apply network values of the defined set of network values to configure said operating system for the communications network.

2. The device of claim 1 wherein the identifier of the device comprises a unique machine identifier.

3. The device of claim 1 wherein:

the first broadcast message is an unrestricted broadcast message;

the second message is a broadcast message carrying a unique said identifier of the device; and the third broadcast message is a restricted broadcast message that is restricted to the device by the unique identifier.

4. The device of claim 3 wherein:

the identifier comprises
      a media access control (MAC) address of a network interface card (NIC) of the network interface.

5. The device of claim 1 wherein:

the device is a server appliance.

6. The device of claim 1 wherein:

the device comprises a dynamic host configuration protocol (DHCP) server for the communications network.

7. A device coupleable to a communications network and capable of adapting to the operating network environment of said communications network subject to network protocol configuration requirements communicated through said communications network, said device comprising:

a) a host computer system including a network interface coupleable to said communications network;

b) an operating system, executable by said host computer system, that is configurable by a defined set of network values for transmitting and receiving messages through said network interface without network configuration conflicts, the operating system including a network protocol stack supporting the sending and receiving of network messages, including broadcast network messages; and c) a control program, responsive to a first broadcast network message received by said host computer system from said communications network by determining from the first message information sufficient to enable the device to transmit a message on the network and by causing the host computer system to transmit on the network a second broadcast network message that includes a predetermined unique identifier of said device, the control program further responsive to a third broadcast network message received by said host computer system from said communications network and directed to the device by the identifier and containing network configuration parameters, by using the contained network parameters to configure the device for communicating on the network.

8. The device of claim 3 wherein:

the first broadcast network message is an unrestricted broadcast message; and the third broadcast network message is a restricted broadcast message that is restricted to the device by the unique identifier of the device.

9. The device of claim 8 wherein:

the unique identifier comprises
      a media access control (MAC) address of a network interface card (NIC) of the network interface.

10. The device of claim 3 wherein:

the device is a server appliance.

11. The device of claim 7 wherein:

the device comprises a dynamic host configuration protocol (DHCP) server for the communications network.

12. A method of communicating between computers is over a network independent of conflicts and omissions in the network protocol configuration of said computers systems with respect to said network, said method comprising the steps of:

a) providing for establishment of a unique identifier for a first one of the computers by determining identifiers of others of the computers to enable transmitting and receiving of messages through said network without network configuration conflicts:

b) the a first computer receiving on the network a first network message broadcast onto said network by a second computer;

c) the first computer using information conveyed by the first message to enable the first computer to transmit a message on the network;

d) the first computer broadcasting a second network is message onto said network, wherein said second network message includes a unique identifier of the first computer within a predefined data portion of said second network message;

e) the first computer receiving on the network a third network message broadcast by the second computer and determining whether said predefined data portion of said third network message includes said unique identifier, wherein the presence of said unique identifier signifies that said third network message is intended for said first computer; and f) in response to said determining, the first computer using information conveyed by the third network message to configure the first computer for communicating on the network.

13. The method of claim 12 wherein said method further comprises the steps of:
   a) the second computer encrypting said third network message with the unique identifier prior to the broadcasting of said third network message; and
   b) the first computer decrypting said second network message after receiving the broadcast of said third network message.

14. The method of claim 12 wherein said third network message includes network configuration parameters determined by a network configuration controller, the method further comprising
   the first computer sending to the second computer a fourth network message which includes network configuration information reflective of said network configuration parameters as adapted by said first computer.

15. The method of claim 14 wherein the step of using comprises:
   a) determining, from said network configuration parameters, a derived network protocol configuration compatible with said network; and
   b) applying said derived network protocol configuration to said first computer to permit communications between said computers subject to the applied network protocol configuration of said a computers.

16. The method of claim 15 wherein said step of sending a fourth network message comprises:
   the first computer broadcasting the fourth network message onto said network, wherein said fourth network message includes said unique identifier and said derived network protocol configuration within said predefined data portion; and
   the method further comprises
      the first computer receiving a broadcast of a fifth network message from said network, determining whether said predefined data portion of said fifth network message includes said unique identifier, and determining from the fifth network message whether said network configuration controller has accepted said derived network protocol configuration.

17. The method of claim 16 wherein said method further comprises the steps of:
   a) encrypting said predefined data portion of said fourth network message prior to broadcasting of said fourth network message; and
   b) decrypting said predefined data portion of said fifth network message after receiving the broadcast of fifth network message.

18. The method of claim 12 wherein:
   the first network message is an unrestricted broadcast message; and
   the third network message is a restricted broadcast message that is restricted to the first computer by the unique identifier.

19. The method of claim 18 wherein:
   the unique identifier comprises
      a media access control (MAC) address of a network interface card (NIC) of the first computer.

20. The method of claim 12 wherein:
   the first computer is a server and the second computer is a client of the server.

21. The method of claim 20 wherein:
   the first computer comprises a dynamic host configuration protocol (DHCP) server of the communications network.

22. A device coupleable to a communications network and capable of initially adapting to the operating network environment of said communications network subject to network protocol configuration requirements communicated exclusively through said communications network, said device comprising:
   a) a host computer system including a network interface controller coupleable to said communications network;
   b) an operating system, executable by said host computer system, that is configurable by a defined set of network values for transmitting and receiving messages through said network interface without network configuration conflicts, the operating system including a network protocol stack supporting the sending and receiving of network messages, including broadcast network messages, said network protocol stack being responsive to a predetermined set of types of unique identifiers for determining the source and destination of network messages; and
   c) a control program responsive to a first broadcast network message received by said host computer from said communications network by determining from identifiers of the predetermined set that are included in the first message information sufficient to enable the device to transmit a message on the network, and causing the host computer to transmit on the network a second broadcast message that includes a predetermined unique identifier of said device that is of a type exclusive of said predetermined set of types, the control program further responsive to a third broadcast network message received by said host computer from said communications network, wherein said third broadcast message is uniquely identified to said device by inclusion of the unique identifier and wherein said third broadcast network message includes network protocol configuration parameters from which said control program determines and implements a derived network protocol configuration compatible with the operating network environment of said communications network.

23. The device of claim 22 wherein:
   the first broadcast network message in an unrestricted broadcast message; and
   the third broadcast message is a restricted broadcast message that is restricted to the device by the unique identifier.

24. The device of claim 23 wherein:
   the unique identifier comprises a media access control (MAC) address of a network interface card (NIC) of the network interface controller.

25. The device of claim 22 wherein:
   the device is a server appliance.

26. The device of claim 22 wherein:
   the device comprises a dynamic host configuration protocol (DHCP) server for the communications network.

27. A first device coupleable to a communications network supporting selfdaptive initial configuration to the parameters of said communications network to enable remote configuration control exclusively via said communications network of a second device coupleable to the network, said first device comprising:
   a) a network interface for coupling to the communications network;

b) means configured by a defined set of network values for transmitting and receiving messages through said network interface without network configuration conflicts and that supports broadcast transmissions of messages through said network interface; and c) means for transmitting over the communications network a first unrestricted broadcast message whose receipt enables the second device to determine therefrom, specifically with respect to said communications network, and to apply to the second device an initial set of network values to configure the second device for broadcasting a message on the communications network; and d) means responsive to receipt of a second message sent over the communications network by the second device and conveying an identifier of the second device, for transmitting over the communications network a third broadcast message and restricting the third broadcast message to the second device by means of the identifier, the third message containing network configuration parameters that enable the second device upon receiving the third message to determine and apply to the second device network values for transmitting and receiving messages through said communications network without network configuration conflicts.

28. The first device of claim 27 wherein:

the second message is a broadcast message carrying a unique said identifier of the second device.

29. The first device of claim 28 wherein:

the unique identifier comprises a media access control (MAC) address of a network interface card (NIC) of the second device.

30. The first device of claim 27 wherein.

the second device is a server device; and the first device is a client device of the server device.

31. The first device of claim 27 wherein:

the second device comprises a dynamic host configuration protocol (DHCP) server for the communications network; and the first device comprises a client of the DHCP server.

32. A method of communicating between computers over a network independent of conflicts and omissions in the network protocol configuration of said computers with respect to said network, said method comprising the steps of:

a) a first one of the computers determining identifiers of others of the computers to establish a unique identifier for the first computer to enable transmitting and receiving of messages through said network without network configuration conflicts;

b) the first computer broadcasting on the network an unrestricted first network broadcast message, the first message including information sufficient to enable a second computer that receives the first message to transmit a message on the network;

c) the first computer receiving a second message transmitted on said network by the second computer, wherein said second is message includes a unique identifier of the second computer;

d) in response to receiving the second message, the first computer broadcasting on the network a restricted third network broadcast message that is restricted to the second computer by the unique identifier, the third message conveying information to configure the second computer for communicating on the network.

33. The method of claim 32 wherein:

the second message is a network broadcast message broadcast on the network by the second computer.

34. The method of claim 32 wherein:

the unique identifier comprises a media access control (MAC) address of a network interface card (NIC) of the second computer.

35. The method of claim 32 wherein:

the second computer is a server; and the first computer is a client of the server.

36. The method of claim 32 wherein:

the second computer comprises a dynamic host configuration protocol (DHCP) server of the communications network; and the first computer comprises a client of the DHCP server.

* * * * *

UNITED STATES PATENT AND TRADEMARK OFFICE
CERTIFICATE OF CORRECTION

PATENT NO.    : 6,629,145 B1          Page 1 of 1
DATED         : September 30, 2003
INVENTOR(S)   : Pham et al.

It is certified that error appears in the above-identified patent and that said Letters Patent is hereby corrected as shown below:

Column 20,
Line 61, please delete "selfdaptive" and replace with -- self-adaptive --.

Signed and Sealed this

Ninth Day of December, 2003

JAMES E. ROGAN
*Director of the United States Patent and Trademark Office*